United States Patent Office 3,352,845
Patented Nov. 14, 1967

3,352,845
METHOD FOR PRODUCING AZOIC PIGMENT
William H. Armento, Albany, N.Y., assignor to General Aniline & Film Corporation, New York, N.Y., a corporation of Delaware
No Drawing. Filed Oct. 1, 1964, Ser. No. 400,938
6 Claims. (Cl. 260—152)

The present invention relates to an improved method for producing azoic pigments obtained by coupling Naphthol AS–SW (3 - hydroxy - N-(2-naphthyl)-2-naphthamide) with a diazo component obtained from a 3-amino-4-methylbenzene sulfonamide or a 3-amino-4-methoxybenzene-1-sulfonamide, which in 6 position may contain a halogen constituent.

Such products are known in the art, having been described, for example, in U.S. Patents 2,025,582 and 2,186,226, and have heretofore been prepared in the usual manner by dissolving the Naphthol AS–SW in aqueous caustic soda and coupling it with solution of diazo component.

However, Naphthol AS–SW is difficultly soluble in aqueous caustic solution, and in order to dissolve it completely, it has been necessary to employ stronger caustic solutions than is desirable and to use higher temperatures for a longer time than normal to effect solution. As a result of the necessity of using such stringent conditions to effect solution of Naphthol AS–SW, there is a noticeable increase in the tendency of the Naphthol AS–SW to hydrolyze with an accompanying formation of $\beta$-naphthylamine (which is a highly toxic carcinogen) and resultant less color value and duller shades in the final pigment.

I have now discovered that if Naphthol AS–SW is dissolved in a solution of aqueous caustic soda and an alcoholic solvent, solution is much easier to achieve; less concentrated caustic can be used, the compound dissolves quickly at a lower temperature, and in a shorter time than would otherwise be required. The color value and brightness of the resulting pigment is considerably improved over a pigment prepared by the Naphthol AS–SW dissolved in aqueous caustic alone, and there has been less chance for formation of $\beta$-naphthylamine due to hydrolysis.

The pigments produced in accordance with the present invention may be represented by the following general formula:

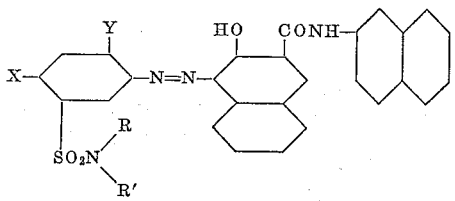

wherein Y represents methyl or methoxy; X represents hydrogen or halogen, e.g., Cl, F and Br; and R and R' may be hydrogen, lower alkyl such as methyl, ethyl, propyl, butyl, isobutyl, cyclohexyl, aryl such as phenyl, anisyl, chlorophenyl and the like, and jointly may be alkylene or oxygen interrupted alkylene, e.g.,

may represent morpholino or piperidino.

In brief, in carrying out the process of this invention, 1 mole of Naphthol AS–SW is dissolved in an aqueous solution of caustic soda which contains 1 mole of caustic soda and from about 2.0 to 10 moles of alcoholic solvent. The concentration of the caustic soda solution is generally of about 3.4%–6.5%.

The solvent alcohol employed may be a lower aliphatic alcohol, a lower alkyl dihydroxy compound or an ether thereof, e.g., methyl alcohol, ethyl alcohol, propyl and isopropyl alcohol, butyl alcohol, ethylene glycol, ethylene diglycol, methoxyethanol, 2-ethoxyethanol (Cellosolve), 2-butoxyethanol, 1,3-propanediol and 1,4-butanediol.

The pigment is then prepared in conventional manner by diazotizing an aryl amine of the formula:

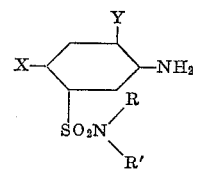

wherein X, Y, R and R' are defined as above. A number of suitable diazo components of this formula are disclosed for example in U.S. Patent 2,025,582. The diazo compound is then coupled with the coupling component in conventional manner and the thus produced pigment is then isolated in conventional manner, e.g., by washing and drying.

The details of present invention will be apparent to those skilled in the art from a consideration of the following specific examples of preferred embodiments thereof:

Example 1

16.8 g. of N-butyl-4-methoxymetanilamide is stirred to solution in 150 g. of water and 33.0 g. of hydrochloric acid 20° Bé. It is iced to 0° C. 4.5 g. of sodium nitrite as a 31.5% solution is run in and stirred for 1 hour at 0–5° C. It is clarified with Super-Cel (diatomaceous silica) and filtered.

37.5 g. of Cellosolve (2-ethoxyethanol), 4.2 g. of caustic soda solution as a 30% by weight solution, and 39 g. of water at 90° C. are combined. The temperature falls to about 65° C. 22.5 g. of Naphthol AS–SW is then added and stirred to solution. 400 g. of water is added under agitation. At the same time 3.4 g. of caustic soda solution (30% by weight) is added and 6.5 g. of sodium acetate crystals. At a temperature of about 30° C. the diazo solution (at a temperature of 5° C.) is run in under agitation. 1.3 g. of polyoxyethylated oleyl alcohol (obtained by condensing 1 mole of oleyl alcohol with 20 moles of ethylene oxide), dissolved in 10 g. of warm water, is added. The pH is adjusted to about 5 with caustic soda solution and allowed to stir overnight. It is heated to 98° C. and stirred for 1 hour, filtered, washed neutral to Delta paper and dried. The yield of presscake is 150 g. The product has the formula:

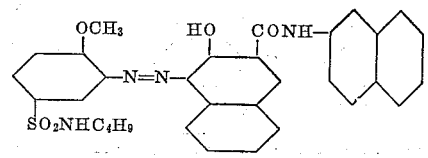

Example 2

Example 1 is repeated with the exception that the 16.8 g. of N-butyl-4-methoxymetanilamide is replaced by 16.8 g. of N,N-diethyl-4-methoxymetanilamide. A product is obtained of the formula:

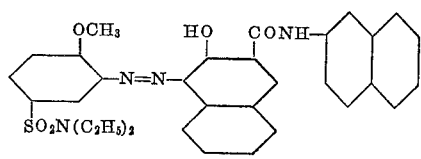

Example 3

Example 1 is repeated, with the exception that the 16.8 g. of N-butyl-4-methoxymetanilamide is replaced by 20.5 g. of N-butyl-6-chloro-4-methoxymetanilamide. A pigment is produced of the formula:

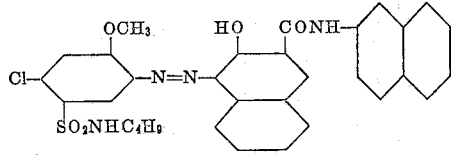

Example 4

Example 1 is repeated, with the exception that the 16.8 g. of N-butyl-4-methoxymetanilamide is replaced by 19.0 g. of 3-amino-4-methoxybenzene sulfonomorpholide. A pigment is produced of the formula:

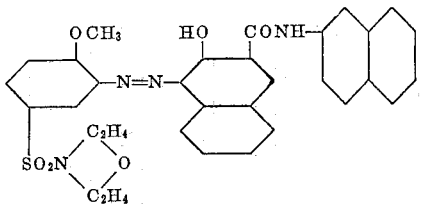

Example 5

Example 1 is repeated, with the exception that the 16.8 g. of N-butyl-4-methoxymetanilamide is replaced by 18.9 g. of 3-amino-4-methoxybenzene sulfonopiperidide. A pigment is produced of the formula:

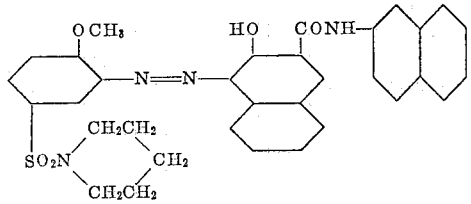

Example 6

Example 1 is repeated with the exception that the 37.5 g. of Cellosolve is replaced by (1) 16 g. of methanol, (2) 23 g. of ethanol, (3) 30 g. of isopropanol, (4) 31 g. of glycol and (5) 38 g. of methoxyethanol. In all five cases the Naphthol AS–SW dissolved readily and gave a product commensurate with the product of Example 1.

Example 7

Example 1 is repeated with the exception that the 16.8 g. of N-butyl-4-methoxymetanilamide is replaced by 15.7 g. of N-butyl-4-methylmetanilamide. A product is obtained of the formula:

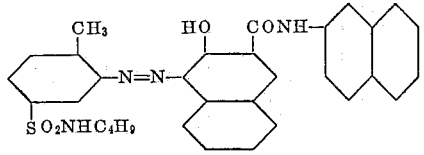

It will be understood that the foregoing examples represent preferred embodiments of the present invention and that various modifications and variations thereof will suggest themselves to those skilled in the art and are included in the scope of the appended claims.

I claim:
1. In a process for producing azoic dyes and pigments of the formula:

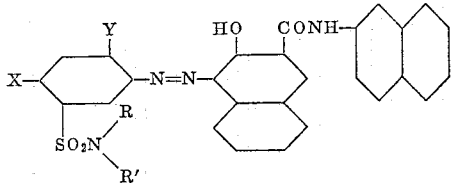

where Y represents a member of the group consisting of —CH$_3$ and —OCH$_3$; X represents a member of the group consisting of H, Cl, F and Br; and R and R' each represent a member of the group consisting of H, lower alkyl of 1 to 4 carbon atoms, cyclohexyl, phenyl, chlorophenyl and anisyl and together may represent a 5-atom alkylene group, including an oxygen interrupted alkylene group of 5 atoms, of piperidine or morpholine; wherein 3-hydroxy-N-(2-naphthyl)-2-naphthamide dissolved in aqueous caustic soda is coupled with a diazotized 3-aminobenzene sulfonamide of the formula:

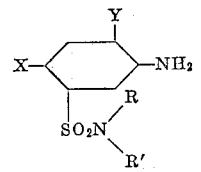

where X, Y, R, R' are as defined above; the improvement which comprises dissolving 1 mole of 3-hydroxy-N-(2-naphthyl)-2-naphthamide in an aqueous alcoholic solution of caustic soda having a concentration within the range of 3.4% to 6.5% and containing 1 mole of caustic soda and from 2 to 10 moles of a water soluble aliphatic hydroxy compound selected from a group consisting of lower aliphatic alkanols of from 1 to 4 carbon atoms, lower alkylene diols of from 2 to 4 carbon atoms and monoethers of said diols with a lower aliphatic alkanol of 1 to 4 carbon atoms.

2. The process as defined in claim 1 wherein the aliphatic hydroxy compound specified is 2-ethoxyethanol.

3. The process as defined in claim 1 wherein the 3-aminobenzene sulfonamide is N-butyl-4-methoxymetanilamide.

4. The process as defined in claim 1 wherein the 3-aminobenzene sulfonamide is N-butyl-6-chloro-4-methoxymetanilamide.

5. The process as defined in claim 1 where the 3-aminobenzene sulfonamide is 3-amino-4-methoxybenzene sulfonomorpholide.

6. The process as defined in claim 1 where the 3-aminobenzene sulfonamide is 3-amino-4-methoxybenzene sulfonopiperidide.

References Cited

UNITED STATES PATENTS

| | | | |
|---|---|---|---|
| 2,025,582 | 12/1935 | Fischer | 260—204 |
| 2,186,226 | 1/1940 | Zerweck et al. | 260—204 |
| 2,275,124 | 3/1942 | Zwilgmeyer | 260—204 |
| 3,127,391 | 3/1964 | Neave et al. | 260—204 |
| 3,153,032 | 10/1964 | Dehn et al. | 260—204 |

FLOYD D. HIGEL, *Primary Examiner.*